United States Patent [19]

Kostandov et al.

[11] 4,234,659

[45] Nov. 18, 1980

[54] COMPOSITE MATERIAL AND METHOD OF PRODUCING SAME

[76] Inventors: Leonid A. Kostandov, Vorobievskoe shosse, 6, kv. 4; Nikolai S. Enikolopov, Kutuzovsky prospekt, 26, kv. 245; Fridrikh S. Dyachkovsky, Vorobievskoe shosse, 2-b, kv. 9; Ljudmila A. Novokshonova, ulitsa 26 Bakinskikh komissarov, 7, korpus 4, kv. 38; Jury A. Gavrilov, Chistoprudny bulvar, 14, kv. 57, all of, Moscow; Olga I. Kudinova, poselok Kratovo, ulitsa Malakhovskaya, 15, Moskovskaya oblast; Tatyana A. Maklakova, Leningradskoe shosse, 8/2, kv. 200, Moscow; Leonid A. Akopian, Mytischi, ulitsa Tereshkovoi, 11, kv. 21, Moskovskaya oblast; Otar P. Mchedlov-Petrosian, ulitsa Vorobieva, 14, kv. 5, Kharkov; Mikhail I. Boiko, ulitsa Arkhangelskaya, 12, kv. 54, Kharkov; Alexander A. Staroselsky, ulitsa Stadionnaya, 21, kv. 76, Kharkov; Vladimir P. Tkachenko, ulitsa akademika Makarova, 13, kv. 24, Moscow, all of U.S.S.R.

[21] Appl. No.: 943,188

[22] Filed: Sep. 18, 1978

[51] Int. Cl.$^3$ .......................... B32B 5/16; B32B 9/00
[52] U.S. Cl. .............................. 428/403; 252/429 C; 260/42.39; 428/404; 428/407

[58] Field of Search ............... 428/304, 306, 404, 407, 428/403, 323, 325; 526/124, 129, 156, 904, 901, 909; 252/429 C; 260/42.39

[56] References Cited

U.S. PATENT DOCUMENTS

| | | | |
|---|---|---|---|
| 4,035,560 | 7/1977 | Caumartin et al. | 526/129 |
| 4,091,164 | 5/1978 | Schwarz | 428/403 |
| 4,142,990 | 3/1979 | Ligorati et al. | 526/129 |
| 4,169,927 | 10/1979 | Hill et al. | 526/124 |

Primary Examiner—William J. Van Balen
Attorney, Agent, or Firm—Fleit & Jacobson

[57] ABSTRACT

The composite material, which is a solid porous carrier, whose pores are filled with a polymer, a polyolefin having the molecular weight not less than 300,000, the degree of pore filling with said polymer being at least 4 percent of the total volume of the pores, in which the ratio of the carrier mass to the mass of the polymer is 50–99.5:50–0.5. The method of producing said composite material consists in precipitation, from the gas phase, of a complex organometallic catalyst consisting of a compound of a transition metal and of an organic compound of a metal in the 2nd or 3rd group of the Periodic Table, inside the pores of a solid porous carrier, and in polymerization of olefins from the gas phase on said catalyst, precipitated in the pores of the solid porous carrier, at a temperature of 50°–165° C. and a pressure of 1–60 atm. The composite material is characterized by high mechanical strength (compression strength reaching 100–200 kg/sq. cm) high frost resistance, and hydrophobic properties. The proposed method effectively controls the degree of filling the carrier pores with the polymer (from at least 4 percent of the total volume of the pores), and can be used to manufacture composite materials possessing a predetermined set of properties.

10 Claims, No Drawings

COMPOSITE MATERIAL AND METHOD OF PRODUCING SAME

FIELD OF THE INVENTION

This invention relates to composite materials and methods of producing them. Said composite materials are used in the industry of building materials as lightweight aggregates of concretes.

BACKGROUND OF THE INVENTION

Known in the prior art is a composite material which is a solid porous carrier, concrete, whose cells are filled with low-molecular weight (under 70,000) polyethylene, the concrete cells being filled with the polyethylene to 0.5-1.0 percent with respect to the total volume of the cells.

Known in the prior art is another method of producing said composite material by impregnating a solid porous carrier, concrete, with a solution or a melt of a polymer, a low-molecular weight polyethylene.

The viscosity of solutions and melts is high and it is therefore difficult to fill the pores of the carrier to the required extent. It has been stated above that only about 0.5-1.0 percent of the total volume of the carrier cells are filled. It should be understood that the smaller the diameter of the pores, the lesser the filled volume of the pores. This disadvantage is responsible for the manufacture of composite materials possessing inadequate properties, namely, low resistance to frost and moisture.

Known in the prior art is a composite material which is a solid porous carrier, for example, ceramsite, whose cells are filled with polystyrene or polyacrylates. The ratio of the carrier mass to the mass of the polymer is 97:3.

Known in the prior art is another method of producing said composite material by impregnating a solid porous carrier, e.g. foamed clay, with a liquid monomer or a solution of the monomer, for example styrene, acrylic acid, or its derivatives, and also with an initiator of a radical chain polymerization, with subsequent thermal or radiation polymerization of the monomers in the carrier pores.

This method does not provide a reliable control of the filling of pores with polymers either, and it is therefore difficult to obtain a composite material possessing the prescribed properties.

SUMMARY OF THE INVENTION

It is an object of this invention to provide a composite material having high strength, frost resistance, and hydrophobic properties.

Another object of the invention is to provide a method of producing a composite material having said properties.

In accordance with these and other objects the invention consists in that proposed herein is a composite material, which is a solid porous carrier, whose pores are filled with a polymer, in which according to the invention, the composite material contains a polyolefin as the polymer, the molecular weight of said polyolefin being not less than 300,000, the pores of the carrier being filled with the polymer to at least 4 percent of the total volume of the pores, the ratio of the carrier mass to the mass of the polymer being 50-99.5:50-0.5.

The proposed composite material has a high strength (the material has a compression strength of 100-200 kg/sq.cm). Said material is also characterized by a high resistance to frost (the material withstands 540 cycles without fracture, which corresponds to 180 days; the frost-defrost cycle consists of cooling the material minus 2° to minus 3° C. for 4 hours with subsequent heating to 20° C. for 4 hours). Moreover, the proposed material is highly hydrophobic (the hydrophobic properties are determined by absorption of water at a temperature of 20° C.; for example, a composite material which is Ceramsite having the bulk weight of 600 kg/cu.m., whose pores are filled with polyethylene to 15 percent of their total volume, the ratio of the carrier mass to the mass of the polymer being 93:7, absorbs 0.1 percent by weight of water).

The object of this invention is also to provide a method for producing said composite material, which according to the invention consists in precipitation, from the gas phase, of a complex organometallic catalyst consisting of a compound of a transition metal and of an organic compound of a metal in the 2nd or 3rd group of the Periodic Table, in the pores of a solid porous carrier, and in polymerization of olefins, from the gas phase, on said catalyst precipitated in the pores of the solid porous carrier, at a temperature of 50°-165° C., and a pressure of 1-60 atm; said precipitation is effected in two steps, the first component of the catalyst, viz., the compound of a transition metal, being precipitated at the first stage, and the second component of the catalyst, viz., the organic compound of a metal standing in the 2nd or 3rd group of the Periodic Table, at the second stage; precipitation from the gas phase of the first component of the catalyst is effected at a temperature of 20°-300° C. and at varying pressure which is first raised by at least 30 percent of the initial pressure and then lowered to at least the starting pressure, the latter being maintained within the range from 0.05 to 1.2 atm; the second component of the catalyst is precipitated from the gas phase at a temperature of 20°-165° C.

The catalyst components can be precipitated in the pores of a solid porous carrier in the sequence as described above, before carrying out the polymerization process.

Another version is also possible by which the first component of the catalyst, the compound of a transition metal, is precipitated in the pores of a solid porous carrier before carrying out the polymerization process, whereas the second component of the catalyst, the organic compound of a metal in the 2nd or 3rd group of the Periodic Table, is precipitated simultaneously with the polymerization process.

In order to improve the frost resistance, mechanical strength, and hydrophobic properties of the composite material, it is recommended that, after carrying out the polymerization process, the obtained composite material be treated at a temperature of from 120° to 200° C. for 10-30 minutes.

The proposed method provides a composite material of a high quality possessing a set of predetermined properties. The method can be used to control, within wide limits, the degree of filling the carrier pores with a polymer (from at least 4 percent of the total volume of the pores), and hence the properties of the obtained composite material can be varied within wide limits as well.

DETAILED DESCRIPTION OF THE INVENTION

Polyolefins, for example, polyethylene, polypropylene, polyisobutylene, polymethylpentene, copolymers of various olefins, e.g., a copolymer of ethylene with propylene can be used as polymers in the proposed composite material.

A solid porous carrier for said composite material can be selected from the group containing, for example, Ceramsite, fired clay, expanded perlite, foamed glass, tripoli gravel, porous slags. The size of pores of the carrier can vary within wide limits (from a micron to a few millimeters).

The starting olefins that can be used in the proposed method of producing composite material, can be for example, ethylene, propylene, butene, methylpentene. Individual olefins and their various combinations can be used for the purpose.

The proposed method of producing the composite material can be realized as follows.

Whenever necessary, a solid porous carrier is dried before loading into a reaction vessel at a temperature of from 100° to 300° C. for 1-3 hours. The carrier is then loaded into the reactor which is blown with an inert gas or evacuated. Vapours of a compound of a transition metal (the first component of a complex organometallic catalyst) are then delivered into the reactor, either individually or with a stream of an inert carrier gas. The temperature in the system is maintained, depending on the nature of the transition metal compound, within the range of from 20° to 300° C., whereas the initial pressure of the gas in the system is maintained within the range of from 0.05 to 1.2 atm. The gas pressure in the system is then raised by at least 30 percent of the initial value. The gas pressure in the system is then lowered to at least the initial value. In the meantime, the carrier gas and the vapours of the transition metal compound, or the vapours of the transition of metal compound alone, fills the pores of the solid porous carrier and the first component of the catalyst is precipitated in them.

Depending on the type of a solid porous carrier and the desired degree of pore filling with the polymer, the quantity of the compound of a transition metal precipitated in the pores ranges from 0.001 to 0.05 percent of the mass of the porous carrier.

One cycle of raising and lowering the pressure can be sufficient, but whenever the diameter of pores in the solid carrier is small, the procedure can be repeated once, twice, etc.

As soon as the first component of the complex organometallic catalyst has been deposited in the pores of the carrier, the second component of the catalyst, namely an organic compound of a metal of the 2nd or 3rd group of the Periodic Table, is introduced into the reaction vessel. The temperature inside the reactor should be maintained at the level of from 20 to 165° C. Said organometallic compound is introduced into the reactor either in the vapour form with the flow of the inert carrier gas, or in the vapour form with a flow of the gaseous monomer. The second component of the catalyst is introduced into the reactor in a quantity at least equal to the quantity of the precipitated first component. The optimum quantity of the second component of the catalyst is 0.003 to 0.15 percent of the carrier mass.

If the second component of the catalyst is delivered into the reactor in the form of vapours alone, or in the form of vapours with a flow of an inert gas (carrier gas), the second component of the catalyst is precipitated before carrying out the polymerization process. As soon as the second component has been precipitated in the pores of the carrier, and the complex organometallic catalyst is accordingly formed, olefins are polymerized. To that end, olefins are delivered into the reactor and the polymerization is effected, from the gas phase, at a temperature of 50°-165° C. and a pressure of from 1 to 60 atm.

If the second component of the catalyst is introduced into the reactor in the vapour form with a flow of the monomer, said component of the catalyst is precipitated in the pores of the carrier simultaneously with the polymerization process.

It is recommendable that the processes of precipitation of the first and second components of the catalyst, and of the polymerization of olefins be carried out with stirring the solid porous carrier. Stirring can be effected under the conditions of fluidized or filtering bed, mechanical stirring or stirring by gravity, by pneumatic or vibrational transport.

When the required degree of pore filling with the polymer has been attained (from at least 4 percent of the total volume of the pores), the polymerization process is stopped by lowering the monomer pressure (by discontinuing its delivery into the reactor) or by lowering the temperature. The finished product (composite material) is then cooled if necessary, and discharged from the reactor.

The degree of pore filling with the polymer can be varied within wide limits by changing the process temperature, pressure, and varying the time of the polymerization process.

In order to improve the material strength, resistance to frost, and hydrophobic properties, the composite material can be given an additional thermal treatment at a temperature of from 120° to 200° C. for 10-30 minutes. During this treatment, the polymer is fused in the carrier pores and closes them.

For a better understanding of the invention the following examples of its practical embodiment will be given below by way of illustration.

EXAMPLE 1

92 kg of ceramsite gravel (granule size 15-20 mm, bulk weight 500 kg/Cu.m., compression strength 28 kg/sq.cm., total porosity 50 percent by volume) are dried at a temperature of 200° C. and then placed into a reactor. The reactor is evacuated, and then at a temperature of 20° C. 4.1 g of vanadium tetrachloride in the vapour form is introduced thereinto with a flow of nitrogen. The initial pressure of the gas in the reactor is 0.1 atm. The gas pressure is then raised to 0.5 atm. and then, in 1-2 minutes, the pressure is lowered to the initial value. Vanadium tetrachloride is deposited in the carrier pores as a result of this procedure. Then at the temperature of 20° C. diethylaluminium chloride (12 g), in the vapour form, is introduced into the reactor with a flow of ethylene. The reactor is thermostatted at 50° C., and the ethylene pressure is raised to 60 atm. Under the specified temperature and pressure conditions ethylene polymerization is carried out. The total duration of the polymerization process is 120 minutes. On completion of the polymerization the reactor is purged with nitrogen and the resultant product is discharged.

The thus-prepared composite material contains 8.4 kg of polyethylene. The degree of pore filling is 18 percent of the total pore volume. The ratio of the mass of the porous carrier to the mass of the polymer in the obtained composite material is 91:9. The molecular weight of the polymer is 700,000.

The compression strength of the obtained composite material is 130 kg/sq.cm.

To determine the frost resistance of the composite material, it is first cooled to minus 2°–minus 3° C. for 4 hours, and then heated to 20° for 4 hours. The material remains still undestroyed after 540 cycles of cooling and heating.

The non-filled Ceramsite gravel is destroyed after 15 cycles.

The composite material prepared as described in this Example absorbs 0.3 mass percent of water.

The starting carrier (without polyethylene) absorbs 24 mass percent of water.

In order to increase the strength, frost resistance, and hydrophobic properties, the composite material is loaded into a reactor and heated at a temperature of 190° C. for 10 minutes. The material is then cooled and unloaded from the reactor. After this thermal treatment the material has the following specifications: compression strength, 152 kg/sq.cm; frost resistance, 540 cycles; absorption of moisture, 0.05 percent by weight.

EXAMPLE 2

A reactor is loaded with 190 kg of tripoli gravel (granule size 10–15 mm, bulk weight 600 kg/cu.m., compression strength 56 kg/sq.cm, total porosity 30 percent by volume, absorption of moisture 17 percent by weight, and frost resistance 20 cycles), and the material is dried at a temperature of 200° C. The reactor is cooled to 165° C., evacuated, and 30 g vanadium tetrachloride is introduced into the reactor together with a current of nitrogen. The initial pressure of the gas in the reactor is 0.5 atm. The pressure inside the reactor is raised to 0.7 atm and then lowered to 0.3 atm. Vanadium tetrachloride is thus precipitated in the carrier pores. At 165° C. 40 g triethylaluminium vapours is introduced into it with a current of nitrogen. Propylene is then delivered into the reactor to build up a pressure of 20 atm. Propylene is polymerized at a temperature of 165° C. The overall time of the polymerization process is 90 minutes. The reactor is then cooled, blown with nitrogen to remove non-polymerized propylene, and the obtained composite material unloaded from the reactor.

The composite material thus obtained contains 0.95 kg of polypropylene. The degree of pore filling is 4 percent with respect to the total pore volume. The ratio of the mass of the porous carrier to the mass of the polymer is 99.3:0.7. The molecular weight of the polymer is 300,000.

The compressive strength of the composite material is 80 kg/sq.cm. Frost resistance of the material is 340 cycles. Absorption of water is 0.12 percent by weight.

EXAMPLE 3

A reactor is loaded with 1.3 g of expanded perlite in the form of granules sizing 3–10 mm (the bulk weight 270 kg/cu.m., compression strength 14.2 kg/sq.cm, total porosity 83 percent by volume, absorption of moisture 40 percent by weight) and the material is dried at a temperature of 200° C. The reactor is then evacuated. The temperature in the reactor is simultaneously lowered to 90° C. When the temperature in the reactor has been stabilized, 1.3 g titanium tetrachloride, in the vapour form, is added along with a current of nitrogen. The initial pressure of the gas inside the reactor is 0.07 atm. The perlite charge is stirred inside the reactor by gravity. The gas pressure inside the reactor is raised to 1 atm and then lowered again to 0.7 atm. 5 g diethylzinc vapour is introduced into the reactor with a current of nitrogen. The reactor is then blown with a mixture of ethylene and alpha-butene, taken at the molar ratio of 4:1. The copolymerization process is carried out at a temperature of 90° C. and a pressure of 1 atm. The time of the polymerization process is 15 hours. The reactor is then blown with nitrogen and simultaneously cooled to 20° C. The obtained composite material is then unloaded from the reactor.

The composite material contains 0.23 kg of copolymer of ethylene with alpha-butene. The degree of pore filling is 9 percent with respect to the total volume of the pores. The ratio of the porous carrier (expanded perlite) mass to the mass of the copolymer is 85:15. The molecular weight of the copolymer is 300,000.

The compressive strength of the composite material is 25 kg/sq.cm. Frost resistance of the material is 400 cycles. Absorption of moisture is 1.0 percent by weight.

EXAMPLE 4

A reactor is loaded with 72 kg of dried Ceramsite gravel (granule size 15–20 mm, bulk weight 500 kg/cu.m., compressive strength 28 kg/sq.cm, total porosity 50 percent by volume, frost resistance 15 cycles) and blown through with nitrogen for 15 minutes. The reactor is then heated to 70° C. and 5.3 g vanadium oxytrichloride, in the vapour form, is introduced into it along with a current of nitrogen. The initial gas pressure in the reactor is 1.2 atm. The pressure of gas in the system is raised to 2.0 atm and then lowered again to 1.2 atm. Vanadium oxytrichloride is thus precipitated inside the carrier pores. 5 g triisobutylaluminium is introduced into the reactor, in the vapour form, along with a current of ethylene. The process of precipitation of triisobutylaluminium in the carrier pores occurs simultaneously with ethylene polymerization. The pressure of ethylene in the system is 5 atm. The polymerization process is carried out at a temperature of 70° C. and the above-specified pressure. The overall time of the polymerization process is 4.5 hours. On completion of the polymerization process, the reactor is blown with nitrogen, cooled to 20° C., and the resulting composite material is unloaded.

The composite material contains 4.5 kg of the polymer. The degree of pore filling is 12 percent of the total volume of the pores. The ratio of the mass of the porous carrier to the mass of the polymer in the composite material is 94:6. The molecular weight of the polymer is 700,000–750,000.

The compressive strength of the thus-prepared composite material is 70 kg/sq.cm. Frost resistance of the material is 500 cycles. Absorption of moisture is 0.1 percent by weight.

EXAMPLE 5

A reactor is loaded with 1.2 kg of foamed glass, dried at 200° C., in the form of granules sizing 5–10 mm (bulk weight 40 kg/cu.m., compressive strength 0.5 kg/sq.cm, total porosity 90 percent by volume). The reactor is evacuated and the temperature is then raised to 300° C., the carrier is stirred continually, and 2 g iron trichloride is added, in the vapour form, together with a flow of nitrogen. The initial gas pressure unside the system is 0.5 atm. The pressure is then raised to 1 atm and then lowered to 0.6 atm. Iron trichloride is thus precipitated in the pores of foamed glass. The reactor is then cooled to 70° C. and 2.4 g triisobutylaluminium is introduced thereinto in the vapour form. Ethylene is then introduced into the reactor to build up a pressure of 25 atm. Ethylene is polymerized at a temperature of 70° C. and under the above-specified pressure. The overall time of the polymerization process is 3.5 hours. On completion of the polymerization process the reactor is blown with nitrogen, cooled to 20° C., and the composite material unloaded from the reactor.

The obtained composite material contains 1200 g of polyethylene. The degree of pore filling is 30 percent of their total volume. The ratio of the porous carrier mass to the mass of the polymer is 50:50. The molecular weight of the polymer is 500,000.

The compression strength of the material is 5 kg/sq.cm. Absorption of water is 1.0 percent by weight.

To improve the strength, frost resistance, and hydrophobic properties of the obtained composite material, it is loaded into the reactor and kept there for 30 minutes at a temperature of 120° C. The material is then cooled to 20° C. and unloaded from the reactor. The new characteristics of the thus-treated composite material are as follows: compressive strength 10 kg/sq.cm, absorption of moisture 0.5 percent by weight.

What is claimed is:

1. A composite material comprising a solid porous carrier having pores filled with a polyolefin polymer having a molecular weight of at least 300,000, said polymer filling at least 4 percent with respect to the total volume of the pores, the ratio of the carrier mass to the mass of the polymer being 50–99.5:50–0.5.

2. The composite material of claim 1 in which the composite material has a compression strength of 100 to 200 kg/sq.cm.

3. The composite material of claim 1 in which said composite material has a frost resistance of up to 540 cycles.

4. The composite material of claim 1 in which said composite material is hydrophobic.

5. The composite material of claim 1 in which said polyolefin is selected from the group consisting of polyethylene, polypropylene, polyisobutylene, polymethylpentene, and a copolymer of an olefin with another monomer.

6. The composite material of claim 1 in which the carrier is selected from the group consisting of ceramsite, fired clay, expanded perlite, foamed glass, tripoli gravel and porous slags.

7. The composite material of claim 1 in which the polymer is fused in the carrier pores.

8. A composite building material comprising a solid porous carrier in aggregate form having pores filled with a polyolefin polymer having a molecular weight of at least 300,000, said polymer filling at least 4 percent with respect to the total volume of the pores, the ratio of the carrier mass to the mass of the polymer being 50–99.5:50–0.5, said composite material being hydrophobic and having a compression strength of 100 to 200 kg/sq.cm. and a frost resistance of up to 540 cycles.

9. The composite building material of claim 8 in which said carrier is selected from the group consisting of ceramsite, fired clay, expanded perlite, foamed glass, tripoli gravel and porous slags.

10. The composite building material of claim 8 in which said polymer is fused in the carrier pores.

* * * * *